(12) United States Patent
Park et al.

(10) Patent No.: US 8,964,354 B2
(45) Date of Patent: Feb. 24, 2015

(54) MULTI-LAYERED CERAMIC ELECTRONIC COMPONENT AND METHOD OF MANUFACTURING THE SAME

(71) Applicant: Samsung Electro-Mechanics Co., Ltd., Sunwon, Gyunggi-do (KR)

(72) Inventors: Ye Jun Park, Gyunggi-do (KR); Jong Han Kim, Gyunggi-do (KR); Jae Man Park, Gyunggi-do (KR); Yoon Hee Lee, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 148 days.

(21) Appl. No.: 13/841,244

(22) Filed: Mar. 15, 2013

(65) Prior Publication Data

US 2014/0104748 A1  Apr. 17, 2014

(30) Foreign Application Priority Data

Oct. 12, 2012  (KR) .......................... 10-2012-0113706

(51) Int. Cl.

| | | |
|---|---|---|
| *H01G 4/005* | (2006.01) | |
| *H01G 4/06* | (2006.01) | |
| *H01G 4/12* | (2006.01) | |
| *H01G 4/01* | (2006.01) | |

(52) U.S. Cl.
CPC . *H01G 4/129* (2013.01); *H01G 4/01* (2013.01)
USPC ...................................... 361/303; 361/321.2

(58) Field of Classification Search
USPC ..................... 361/303, 321.2, 301.4
See application file for complete search history.

(56) References Cited

U.S. PATENT DOCUMENTS

| | | | | |
|---|---|---|---|---|
| 6,143,109 | A * | 11/2000 | Sano et al. ................. | 156/89.16 |
| 6,487,065 | B1 * | 11/2002 | Nishino et al. ............. | 361/321.2 |
| 7,358,207 | B2 * | 4/2008 | Tamura et al. ................ | 501/136 |
| 8,263,515 | B2 * | 9/2012 | Dogan .......................... | 501/134 |
| 8,737,037 | B2 * | 5/2014 | Kim et al. ................... | 361/306.3 |
| 2012/0147518 | A1 * | 6/2012 | Matsuda et al. ........... | 361/301.4 |
| 2013/0286539 | A1 * | 10/2013 | Kim et al. ..................... | 361/303 |

FOREIGN PATENT DOCUMENTS

| | | |
|---|---|---|
| JP | 2004-079994 | 3/2004 |
| JP | 2007-335726 A | 12/2007 |

* cited by examiner

*Primary Examiner* — David M Sinclair
(74) *Attorney, Agent, or Firm* — McDermott Will & Emery LLP

(57) ABSTRACT

There are provided a multi-layered ceramic electronic component and a method of manufacturing the same. The multi-layered ceramic electronic component includes: a ceramic body; internal electrodes formed within the ceramic body and including non-electrode regions formed therein; and external electrodes formed on ends of the ceramic body and electrically connected to the internal electrodes, wherein in a cross section of the internal electrode, 70% or more of the non-electrode regions are distributed in a region formed between points inwardly spaced apart from each of the upper and lower boundary surfaces of the internal electrodes by 5%.

22 Claims, 3 Drawing Sheets

A – A'

MULTI-LAYERED CERAMIC ELECTRONIC COMPONENT AND METHOD OF MANUFACTURING THE SAME

CROSS-REFERENCE TO RELATED APPLICATIONS

This application claims the priority of Korean Patent Application No. 10-2012-0113706 filed on Oct. 12, 2012, in the Korean Intellectual Property Office, the disclosure of which is incorporated herein by reference.

BACKGROUND OF THE INVENTION

1. Field of the Invention

The present invention relates to a multi-layered ceramic electronic component and a method of manufacturing the same, and more particularly, to a multi-layered ceramic electronic component having excellent reliability, and a method of manufacturing the same.

2. Description of the Related Art

In general, electronic components using a ceramic material, such as a capacitor, an inductor, a piezoelectric element, a varistor, a thermistor, or the like, include a ceramic body formed of a ceramic material, internal electrodes formed within the ceramic body, and external electrodes mounted on surfaces of the ceramic body so as to be connected to the internal electrodes.

Among multi-layered ceramic electronic components, a multi-layered ceramic capacitor includes a plurality of stacked dielectric layers, internal electrodes disposed to face each other and having a dielectric layer interposed therebetween, and external electrodes electrically connected to the internal electrodes.

The multi-layered ceramic capacitor has been widely used as a component of computers and mobile communications devices such as a personal data assistant (PDA), a mobile phone, or the like, due to miniaturization thereof, high capacitance, ease of mounting, or the like.

Recently, in accordance with the trend toward high performance and slimness and lightness in the electrical and electronic products industries, compact, high performance, inexpensive electronic components have been required.

Particularly, as central processing unit (CPU) speeds have increased and devices have become miniaturized, lightened, digitalized, and highly-functionalized, research into technologies for implementing characteristics such as miniaturization, thinness, high capacitance, low impedance in a high frequency region, or the like, in the multi-layered ceramic capacitor has been actively undertaken.

Meanwhile, in order to match sintering shrinkage behaviors of the plurality of dielectric layers and the internal electrodes with each other, ceramic powder is added to a paste for the internal electrode.

The ceramic material may be discharged into the dielectric layers during a firing process, such that abnormal grain growth may be generated in an interface between the dielectric layer and the internal electrode.

Therefore, a thickness of the dielectric layer may increase, such that capacitance of the multi-layered ceramic capacitor may be reduced and connectivity of the internal electrode may be also deteriorated.

The following related art document discloses a multi-layered ceramic capacitor capable of adjusting a non-electrode regions in an internal electrode region, but according to the related art, a high capacitance multi-layered ceramic capacitor improving the connectivity of the internal electrode, a purpose of the present invention, may not be sufficiently implemented.

RELATED ART DOCUMENT

Japanese Patent Laid-Open Publication No. 2004-079994

SUMMARY OF THE INVENTION

An aspect of the present invention provides a multi-layered ceramic electronic component having excellent reliability, and a method of manufacturing the same.

According to an aspect of the present invention, there is provided a multi-layered ceramic electronic component including: a ceramic body; internal electrodes formed within the ceramic body and including non-electrode regions formed therein; and external electrodes formed on ends of the ceramic body and electrically connected to the internal electrodes, wherein in a cross section of the internal electrode, 70% or more of the non-electrode regions are distributed in a region formed between points inwardly spaced apart from each of upper and lower boundary surfaces of the internal electrodes by 5%.

A thickness of the internal electrode may be 0.5 μm or less.

A thickness of the dielectric layer may be 0.6 μm or less.

The non-electrode regions may include a ceramic powder.

An average diameter of the non-electrode regions may be 1 to 300 nm.

The non-electrode regions may include voids.

An average size of the voids may be 30 nm or less.

A ratio of the voids of which a central point is distributed in a region formed between points inwardly spaced apart from each of the upper and lower boundary surfaces of the internal electrode by 15 nm may be 90% or more based on the entirety of the voids.

In the case in which an average thickness of the internal electrode is 500 nm, a ratio of the voids distributed in a region formed between points inwardly spaced apart from each of the upper and lower boundary surfaces of the internal electrode by 3% may be 90% or more based on the entirety of the voids.

In the case in which the average thickness of the internal electrode is 400 nm, a ratio of the voids distributed in a region formed between points inwardly spaced apart from each of the upper and lower boundary surfaces of the internal electrode by 3.75% may be 90% or more based on the entirety of the voids.

Connectivity of the internal electrode defined as a ratio of a length of a portion in which the internal electrode is actually formed to the overall length of the internal electrode may be 90% or more.

According to another aspect of the present invention, there is provided a method of manufacturing a multi-layered ceramic electronic component, including: preparing a ceramic green sheet; forming an internal electrode pattern using a conductive paste including a metal powder and a ceramic material powder; stacking the ceramic green sheet having the internal electrode pattern formed thereon to form a ceramic body; and firing the ceramic multi-layer body to form a ceramic body including dielectric layers and internal electrodes, wherein in a cross section of the internal electrode, the internal electrode includes 70% or more of non-electrode regions distributed in a region formed between points inwardly spaced apart from each of upper and lower boundary surfaces of the internal electrode by 5%.

The firing of the ceramic multilayer body may be performed at a heating rate of 30° C./60 s to 50° C./60 s at a temperature of 700° C. or less.

Connectivity of the internal electrode may be 90% or more.

A thickness of the internal electrode may be 0.5 μm or less.

A thickness of the dielectric layer may be 0.6 μM or less.

An average diameter of the non-electrode regions may be 1 to 300 nm.

The non-electrode regions may include voids.

An average size of the voids may be 30 nm or less.

A ratio of the voids of which a central point is distributed in a region formed between points inwardly spaced apart from each of the upper and lower boundary surfaces of the internal electrodes by 15 nm may be 90% or more based on the entirety of the voids.

In the case in which an average thickness of the internal electrode is 500 nm, a ratio of the voids distributed in a region formed between points inwardly spaced apart from each of the upper and lower boundary surfaces of the internal electrode by 3% may be 90% or more based on the entirety of the voids.

In the case in which the average thickness of the internal electrode is 400 nm, a ratio of the voids distributed in a region formed between points inwardly spaced apart from each of the upper and lower boundary surfaces of the internal electrode by 3.75% may be 90% or more based on the entirety of the voids.

The connectivity of the internal electrode defined as a ratio of a length of a portion in which the internal electrode is actually formed to the overall length of the internal electrode may be 90% or more.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
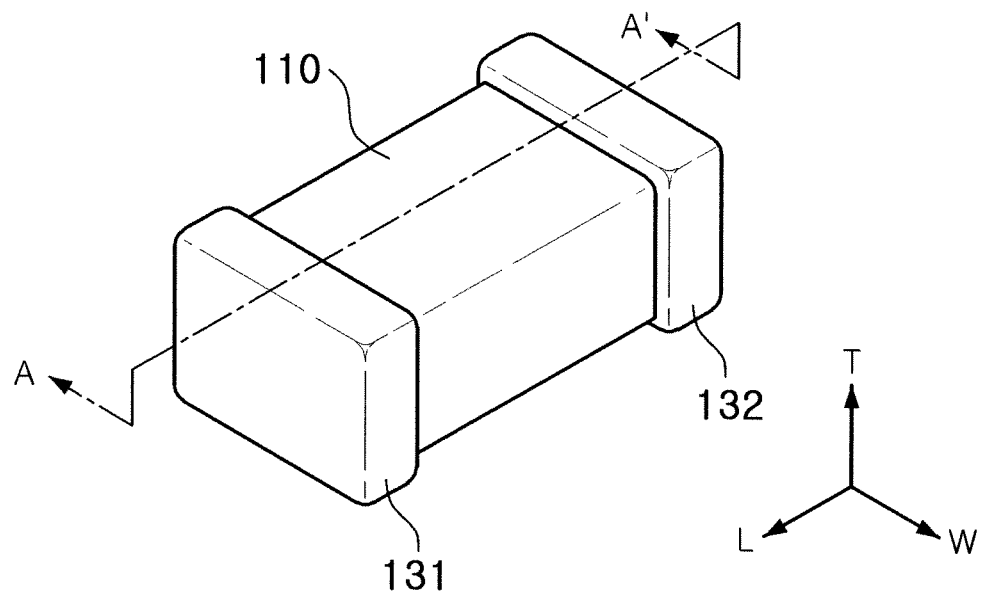
FIG. 1 is a schematic perspective view showing a multilayered ceramic capacitor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

According to an embodiment of the present invention, a ceramic electronic component may be provided, and an example of the electronic component using a ceramic material may include a capacitor, an inductor, a piezoelectric element, a varistor, a thermistor, or the like. Hereinafter, a multilayered ceramic capacitor will be described as an example of the ceramic electronic component.

FIG. 1 is a schematic perspective view showing a multi-layered ceramic capacitor according to an embodiment of the present invention.

Figure 2:
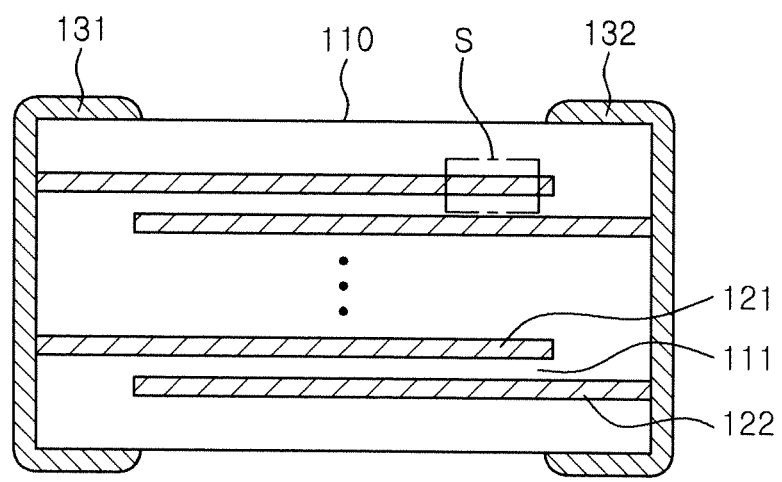
FIG. 2 is a cross-sectional view schematically showing the multi-layered ceramic capacitor taken along line A-A' of FIG. 1.

FIG. 2 is a cross-sectional view schematically showing the multi-layered ceramic capacitor taken along line A-A' of FIG. 1.

Figure 3:
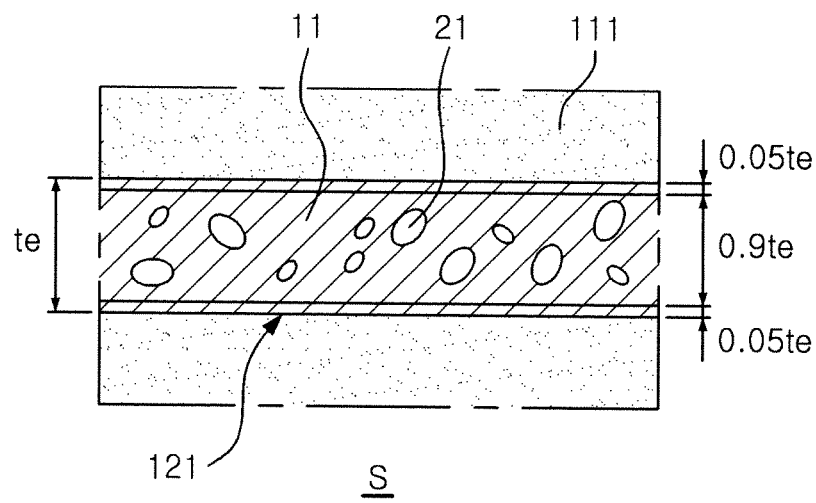
FIG. 3 is an enlarged view of part S of FIG. 2.

FIG. 3 is an enlarged view of part S of FIG. 2.

Referring to FIGS. 1 through 3, the multi-layered ceramic capacitor according to the embodiment of the present invention may include a ceramic body 110, internal electrodes 121 and 122 formed in the ceramic body, and external electrodes 131 and 132 formed on ends of the ceramic body 110.

In the multi-layered ceramic capacitor according to the embodiment of the present invention, a 'length direction' refers to the 'L' direction of FIG. 1, a 'width direction' refers to the 'W' direction of FIG. 1, and a 'thickness direction' refers to the 'T' direction of FIG. 1. The 'thickness direction' is the same as a direction in which dielectric layers are stacked, that is, the 'stacking direction'.

A shape of the ceramic body 110 is not particularly limited, but may be a rectangular parallelepiped shape according to the embodiment of the present invention.

The ceramic body 110 may be formed by stacking a plurality of dielectric layers 111.

The plurality of dielectric layers 111 configuring the ceramic body 110 are in a sintered state and may be integrated such that boundaries between dielectric layers adjacent to each other may not be readily apparent.

The dielectric layer 111 may be formed by sintering of a ceramic green sheet including a ceramic powder.

The ceramic powder is not particularly limited as long as it is generally used in the art.

Although not limited thereto, the dielectric layer 111 may include, for example, a $BaTiO_3$-based ceramic powder.

The $BaTiO_3$-based ceramic powder, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, or the like, is partially dissolved in $BaTiO_3$ may be used, but is not limited thereto.

In addition, the ceramic green sheet may include a transition metal, a rare earth element, Mg, Al, or the like, in addition to the ceramic powder.

A thickness of the dielectric layer 111 may be appropriately changed according to a capacitance design of the multi-layered ceramic capacitor.

Although not limited thereto, for example, a thickness of a dielectric layer 111 formed between two internal electrodes adjacent to each other after sintering may be 0.6 μm or less.

In the embodiment of the present invention, the thickness of the dielectric layer 111 may refer to an average thickness.

The average thickness of the dielectric layer 111 may be measured from an image obtained by scanning a cross-section of the ceramic body 110 cut in the length direction using a scanning electron microscope (SEM), as shown in FIG. 2.

For example, thicknesses at 30 equidistant points in the length direction may be measured, with respect to the dielectric layer randomly sampled from the image obtained by scanning the cross-section of the ceramic body 110 in the length-thickness (L-T) direction taken along a central portion of the ceramic body 110 in the width (W) direction using a scanning electron microscope (SEM), thereby measuring the average value, as shown in FIG. 2.

The thirty equidistant points may be measured in a capacitance forming part, a region in which internal electrodes 121 and 122 are overlapped with each other.

When an average thickness of ten or more dielectric layers is measured, the average thickness of the dielectric layer may be further generalized.

The ceramic body 110 may include the internal electrodes 121 and 122 formed therein.

The internal electrodes 121 and 122 may be formed on the ceramic green sheets, stacked, and sintered to thereby form the ceramic body 110, having a dielectric layer interposed therebetween.

The internal electrodes 121 and 122 having different polarities may be formed in a pair and disposed to face each other in the direction in which the dielectric layers are stacked.

As shown in FIG. 2, distal ends of first and second internal electrodes 121 and 122 may be alternately exposed to end surfaces of the ceramic body 110 in the length direction.

In addition, although not shown, according to the embodiment of the present invention, the first and second internal electrodes may have lead parts and may be exposed to the same surface of the ceramic body through the lead parts. Alternatively, the first and second internal electrodes may have lead parts and may be exposed to at least one surface of the ceramic body through the lead parts.

A thickness of the internal electrodes 121 and 122 is not particularly limited, but, for example, may be 0.5 μm or less.

Alternatively, the thickness of the internal electrodes 121 and 122 may be 0.1 to 0.5 μm. Alternatively, the thickness of the internal electrodes 121 and 122 may be 0.3 to 0.5 μm.

According to the embodiment of the present invention, the number of stacked dielectric layers having the internal electrode formed thereon may be 200 or more. A more detailed description thereof will be described below.

According to the embodiment of the present invention, the ceramic body 110 may include external electrodes 131 and 132 formed on ends thereof, and the external electrodes 131 and 132 may be electrically connected to the internal electrodes 121 and 122.

More specifically, the external electrodes may be configured of a first external electrode 131 electrically connected to the first internal electrode 121 exposed to one surface of the ceramic body 110 and a second external electrode 132 electrically connected to the second internal electrode exposed to the other surface thereof.

In addition, although not shown, a plurality of external electrodes may be formed in order to be connected to the first and second internal electrodes exposed to the ceramic body.

The external electrodes 131 and 132 may be formed of a conductive paste including a metal powder.

The metal power included in the conductive paste is not particularly limited. Ni, Cu, or an alloy thereof may be used, for example.

A thickness of the external electrodes 131 and 132 may be appropriately determined according to the usage, or the like. For example, the thickness may be about 10 to 50 μm.

The internal electrodes 121 and 122 according to the embodiment of the present invention may include non-electrode regions 21 formed therein, and in the cross section of the internal electrodes 121 and 122, 70% or more of the non-electrode regions 21 may be distributed in a region formed between points inwardly spaced apart from each of the upper and lower boundary surfaces of the internal electrodes 121 and 122 by 5%.

According to the embodiment of the present invention, a portion of the internal electrodes except for the non-electrode regions 21 may be considered to be an electrode region 11.

According to the embodiment of the present invention, the non-electrode regions 21 may be formed during a firing process of the internal electrode and formed by a composition of a conductive past forming the internal electrode.

Although not limited thereto, the non-electrode regions 21 may include a ceramic ingredient.

According to the embodiment of the present invention, the non-electrode regions 21 may be formed of an ingredient that is not a conductive metal in the ingredients contained in the conductive paste, for example, a ceramic powder.

In addition, the material forming the non-electrode regions 21 may be, for example, a ceramic material powder, a binder, a solvent, or the like. The binder and the solvent may be present as residual carbon based ingredients by firing. In addition, the non-electrode regions 21 may be voids.

According to the embodiment of the present invention, materials included in the composition of the conductive paste may be trapped in an interface of a metal grain forming the internal electrode, that is, a grin boundary, during a firing process.

This will be more specifically described through a description of a process of forming the internal electrode to be provided below.

According to the embodiment of the present invention, in the cross section of the internal electrodes 121 and 122, 70% or more of the non-electrode regions 21 may be distributed in a region formed between points inwardly spaced apart from each of the upper and lower boundary surfaces of the internal electrodes 121 and 122 by 5%.

Distribution of the non-electrode regions 21 in the embodiment of the present invention may be measured from an image obtained by scanning the cross section of the multi-layered ceramic capacitor using an optical microscope.

The internal electrode and the dielectric layer may be distinguished from each other in an optical image, and the distribution of the non-electrode regions 21 in the internal electrode may be measured.

The non-electrode regions 21 and the electrode region 11 that are formed in the internal electrode are represented by different shades in the optical image to thereby be distinguished from each other.

Although not limited thereto, the distribution of the non-electrode regions 21 may be measured using a computer program such as SigmaScan Pro, or the like.

As described above, the distribution of the non-electrode regions is adjusted so that 70% or more of the non-electrode regions 21 is distributed in a region formed between points inwardly spaced apart from each of the upper and lower boundary surfaces of the internal electrodes 121 and 122 by 5%, whereby connectivity of the internal electrodes may be improved and high capacitance multi-layered ceramic capacitor may be implemented.

A method of adjusting the distribution of the non-electrode regions 21 as described above is not particularly limited. For example, the method may be performed by increasing a heating rate during an initial firing process and a plasticizing process of the multi-layered ceramic capacitor.

That is, the initial firing process is performed at a heating rate of 30° C./60 s to 50° C./60 s at a temperature of 700° C. or less to induce rapid sintering of nickel, such that the non-electrode regions 21 may not be sufficiently diffused.

More specifically, in the case in which the non-electrode regions such as the voids, the ceramic material, or the like, are not sufficiently diffused, the non-electrode regions may not move to a dielectric grain boundary and be present in the grain.

Then, although the firing process is performed at a high temperature of 800° C. or more, it may be difficult to diffuse the non-electrode regions such as the voids, the ceramic material, or the like, to an interface of the internal electrode and the dielectric layer.

That is, a diffusion rate of the non-electrode regions due to factors such as the voids, the ceramic material in the internal electrode may be different according to each region, and a relationship between the diffusion rates of the non-electrode regions according to the regions is as follows.

$$D(s) > D(gb) \gg D(I)$$

D(s): diffusion rate at the interface between the internal electrode and the dielectric layer D(gb): diffusion rate of dielectric grain boundary D(I): diffusion rate at an internal portion of the grain As described above, since the diffusion rates are different, it may be difficult to diffuse the non-electrode regions such as the trapped voids, ceramic material, or the like, to the interface between the internal electrode and the dielectric layer.

Therefore, according to the embodiment of the present invention, connectivity of the internal electrode may be improved, such that a high capacitance multi-layered ceramic capacitor may be implemented.

An average size of the voids included in the non-electrode regions may be 30 nm or less.

A ratio of voids of which a central point is distributed in a region formed between points inwardly spaced apart from each of the upper and lower boundary surfaces of the internal electrode by 15 nm may be 90% or more based on the entirety of the voids.

That is, since the voids are adjusted to have the average diameter of 30 nm or less, the central points of the voids are present at a point spaced apart from a boundary of the void by 15 nm or less.

Therefore, in the case in which the central points of the voids are distributed in the region formed between the points inwardly spaced apart from each of the upper and lower boundary surfaces of the internal electrode by 15 nm, since the voids may be present in the internal electrode, the connectivity of the internal electrode may be improved, such that the high capacitance multi-layered ceramic capacitor may be implemented.

The ratio of the voids of which a central point is distributed in the region formed between the points inwardly spaced apart from each of the upper and lower boundary surfaces of the internal electrode by 15 nm is not particularly limited, but may be, for example, 90% or more based on the entirety of the voids.

In the case in which the rate is lower than 90%, the connectivity of the internal electrode may not be improved.

In the case in which an average thickness of the internal electrode is 500 nm, a ratio of voids distributed in the region formed between points inwardly spaced apart from each of the upper and lower boundary surfaces of the internal electrode by 3% may be 90% or more based on the entirety of the voids.

In the case in which the average thickness of the internal electrode is 400 nm, a ratio of voids distributed in the region formed between points inwardly spaced apart from each of the upper and lower boundary surfaces of the internal electrode by 3.75% may be 90% or more based on the entirety of the voids.

The ratio of the voids distributed in the internal electrode is adjusted according to the average thickness of the internal electrode as described above, such that the connectivity of the internal electrode may be improved, thereby implementing the high capacitance multi-layered ceramic capacitor.

According to the embodiment of the present invention, as the distribution of the non-electrode regions 21 is adjusted, the connectivity of the internal electrode may be 90% or more.

According to the embodiment of the present invention, the connectivity of the internal electrode may be defined as a ratio of a length of a portion in which the internal electrode is actually formed to the overall length of the internal electrode (a length of a portion in which the internal electrode is actually formed/the overall length of the internal electrode).

The overall length of the internal electrode and the length of the portion in which the internal electrode is actually formed may be measured using an optical image obtained by scanning the cross-section of the multi-layered ceramic capacitor as shown in FIG. 3.

More specifically, the ratio of the length of the portion in which the internal electrode is actually formed to the overall length of the internal electrode may be measured from the image obtained by scanning the cross-section of the ceramic body in the length direction taken along the central portion of the ceramic body in the width direction.

In the embodiment of the present invention, the overall length of the internal electrode may refer to a length of one internal electrode including gaps therein, and the length of the portion in which the internal electrode is actually formed may refer to a length of one internal electrode except for the gaps therein. As described above, the gaps refer to voids penetrating through the internal electrode and do not include voids formed only in a portion of a surface of the internal electrode or formed in an inner portion of the internal electrode.

According to the embodiment of the present invention, the actual length of the internal electrode may be measured as a value obtained by subtracting lengths of the gaps from the overall length of the internal electrode.

According to the embodiment of the present invention, the thickness of one internal electrode 121 or 122 may be 0.5 μm or less.

Alternatively, the thickness of one internal electrode 121 or 122 may be 0.1 to 0.5 μm. Alternatively, the thickness of one internal electrode 121 and 122 may be 0.3 to 0.5 μm.

The thickness of the internal electrode in the embodiment of the present invention may be measured from the image obtained by scanning the cross section of the multi-layered ceramic capacitor using an optical microscope as described above. The thickness of the internal electrode may be measured by sampling portions from the scanned image.

For example, the thickness of the internal electrode at 30 equidistant points in the length direction may be measured with respect to the internal electrode randomly sampled from the image obtained by scanning the cross-section of the ceramic body 110 in the length-thickness (L-T) direction taken along a central portion of the ceramic body 110 in the width (W) direction using a scanning electron microscope (SEM), thereby measuring the average value, as shown in FIG. 2.

The thirty equidistant points may be measured in the capacitance forming part, the region in which the first and second internal electrodes 121 and 122 are overlapped with each other.

When an average thickness of ten or more internal electrodes is measured, the average thickness of the internal electrode may be further generalized.

In the multi-layered ceramic capacitor, the capacitance may be formed by the region in which the first and second internal electrodes are overlapped with each other.

Generally, the internal electrode may be lumped and disconnected during a sintering process.

Therefore, the capacitance formed by the internal electrode may be reduced, the capacitance may be irregularly formed, and reliability may be deteriorated.

Therefore, in order to implement high capacitance, the connectivity of the internal electrode needs to be secured.

However, as the multi-layered ceramic capacitor is miniaturized and highly stacked, the internal electrode becomes thinner, and as the internal electrode become thinner, the internal electrode may be more easily disconnected during the sintering process, such that it may be difficult to secure the connectivity of the internal electrode.

However, according to the embodiment of the present invention, connectivity of the internal electrode may be secured by adjusting distribution of the non-electrode regions 21 in the internal electrode.

That is, connectivity of the internal electrodes may be secured by adjusting the distribution of the non-electrode regions so that 70% or more of the non-electrode regions 21 is distributed in a region formed between points inwardly spaced apart from each of the upper and lower boundary surfaces of the internal electrodes 121 and 122 by 5%.

In the case in which the non-electrode regions 21 distributed in the region formed between points inwardly spaced apart from each of the upper and lower boundary surfaces of the internal electrodes 121 and 122 by 5% are lower than 70%, distribution of the non-electrode regions 21 in the regions that are outwardly spaced apart from the upper and lower boundary surfaces thereof by 5% increases, such that connectivity of the internal electrode may be deteriorated.

An average diameter of the non-electrode regions 21 is not particularly limited, but may be, for example, 1 to 300 nm.

In the case in which the average diameter of the non-electrode regions 21 is smaller than 1 nm, deterioration effect of the capacitance by the non-electrode regions may be insignificant, and in the case in which the average diameter is larger than 300 nm, the capacitance may be significantly deteriorated.

Figure 4:
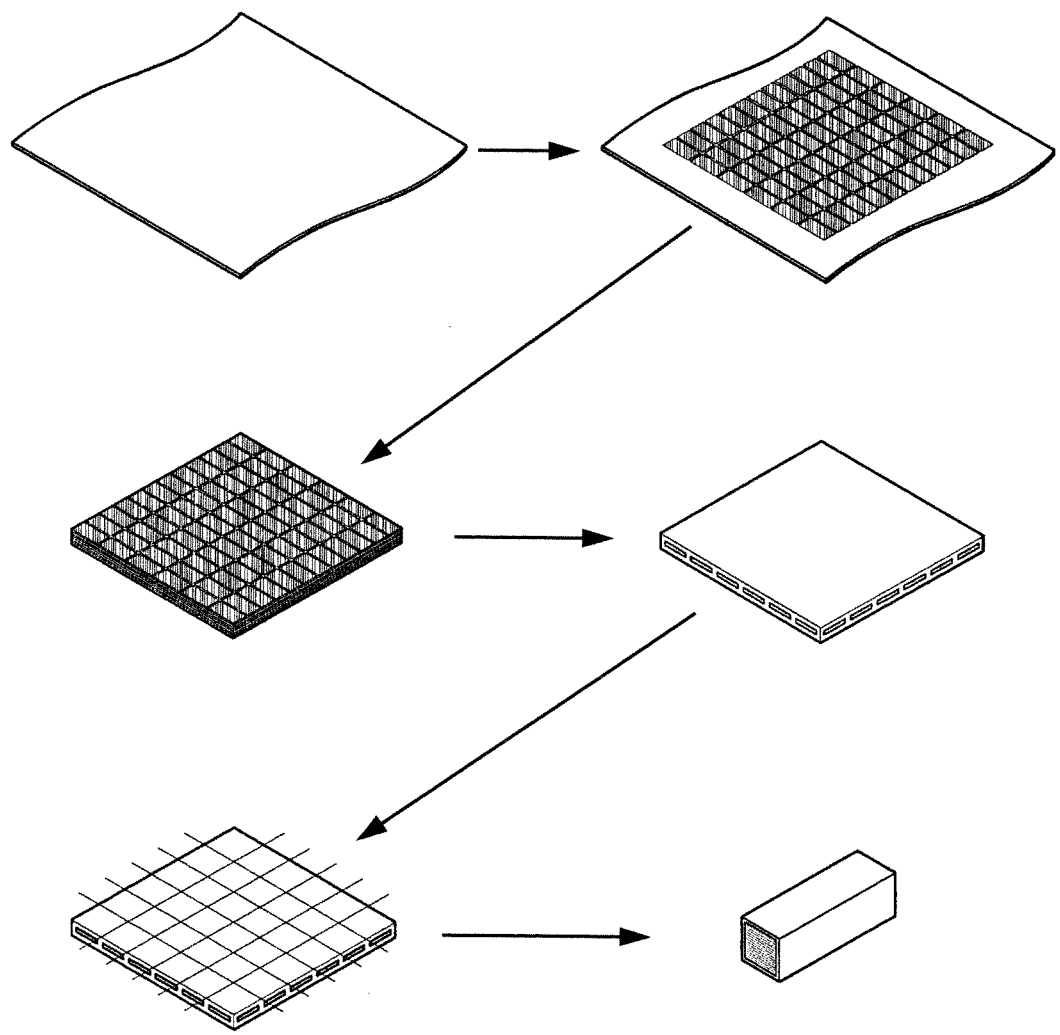
FIG. 4 is a view showing a manufacturing process of a multi-layered ceramic capacitor according to another embodiment of the present invention.

FIG. 4 is a view showing a manufacturing process of a multi-layered ceramic capacitor according to another embodiment of the present invention.

Referring to FIG. 4, the method of manufacturing a multi-layered ceramic capacitor according to another embodiment of the present invention may include preparing a ceramic green sheet; forming an internal electrode pattern using a conductive paste including a metal powder and a ceramic material powder; stacking the ceramic green sheets having the internal electrode pattern formed thereon to form a ceramic multilayer body; and firing the ceramic multi-layer body to form a ceramic body including dielectric layers and internal electrodes.

Hereinafter, a method of manufacturing a multi-layered ceramic capacitor according to another embodiment of the present invention will be described below.

According to the embodiment of the present invention, a plurality of ceramic green sheets may be prepared. The ceramic green sheet may be manufactured by mixing the ceramic powder, a binder, a solvent, and the like to prepare slurry and manufacturing the prepared slurry in a sheet shape having a thickness of several μm by a doctor blade method. The ceramic green sheet may be sintered later to form a dielectric layer 111 as shown in FIG. 2.

Next, the internal electrode pattern may be formed by applying a conductive paste for the internal electrode onto the ceramic green sheet. The internal electrode pattern may be formed by a screen printing method or a gravure printing method.

Then, the ceramic green sheets having the internal electrode pattern formed thereon may be stacked, pressed in the stacking direction, and compressed. Therefore, the ceramic multilayer body including the internal electrode pattern formed therein may be manufactured.

Next, the ceramic multilayer body may be cut in a region corresponding to one capacitor to be formed in a chip form.

At this time, the ceramic multilayer body may be cut so that one ends of the internal electrode pattern are alternately exposed to ends thereof.

Next, the ceramic body may be manufactured by firing the multilayer body in the chip form.

As described above, the firing process may be performed under a reducing atmosphere.

In addition, the firing process may be performed while adjusting a heating rate, and the heating rate may be 30° C./60 s to 50° C./60 s at a temperature of 700° C. or less, but is not limited thereto.

Then, the external electrodes may be formed so as to be electrically connected to the internal electrodes exposed to the ends of the ceramic body while covering the ends of the ceramic body. Thereafter, plating layers formed of nickel, tin, or the like, may be formed on surfaces of the external electrodes.

According to the embodiment of the present invention, in the cross section of the internal electrodes, the non-electrode regions may be formed so that 70% or more thereof is distributed in the region formed between the points inwardly spaced apart from each of the upper and lower boundary surfaces of the internal electrodes by 5% as described above.

Therefore, the connectivity of the internal electrode may become excellent, and high capacitance may be implemented.

According to the embodiment of the present invention, electrode connectivity according to a volume fraction of the voids or the ceramic material distributed in the region formed between the points inwardly spaced apart from each of the upper and lower boundary surfaces of the internal electrode by 5% was compared as shown in the following Table 1.

TABLE 1

| | Volume fraction (%) of the voids or the ceramic material distributed in the region formed between the points inwardly spaced apart from each of the upper and lower boundary surfaces of the internal electrode by 5% | Connectivity of electrode |
|---|---|---|
| 1* | 0 | x |
| 2* | 30 | x |
| 3* | 50 | x |
| 4* | 60 | Δ |
| 5 | 70 | ○ |
| 6 | 80 | ○ |
| 7 | 90 | ○ |
| 8 | 100 | ○ |

[Evaluation]
x: Poor (75% or less),
Δ: Reasonable (75 to 80%),
○: Good (85% or more)
*: Comparative Example Referring to Table 1, in the case of samples 1 through 4 in which a numerical range according to the embodiment of the present invention is not satisfied, there was a problem in terms of connectivity of the internal electrode, such that it was shown that the connectivity is poor or reasonable.

On the other hand, in the case of samples 5 through 8 in which the numerical range of the present invention is satisfied, the connectivity of the internal electrode was 90% or more, such that it was shown that the connectivity is good.

Therefore, according to the embodiment of the present invention, the connectivity of the internal electrodes may be improved, such that the high capacitance multi-layered ceramic capacitor may be implemented.

As set forth above, according to the embodiment of the present invention, the connectivity of an internal electrode may be secured by adjusting an area ratio of the non-electrode regions in the internal electrode.

As the multi-layered ceramic capacitor is miniaturized and highly stacked, the thickness of the internal electrode is reduced, and as the thickness of the internal electrode is reduced, the internal electrode may be more easily disconnected during the sintering process, such that it is difficult to secure the connectivity of the internal electrode. However, according to the embodiment of the present invention, the connectivity of the internal electrode may be secured by forming the non-electrode regions in the internal electrode and adjusting distribution of the ratio of the non-electrode regions.

According to the embodiment of the present invention, the ceramic material powder may be disposed between the metal grains at the time of sintering the metal grains to suppress grain-growth of the metal grain and may be trapped in the internal electrode, thereby securing the connectivity of the internal electrode.

According to the embodiment of the present invention, an internal structural defect such as cracks in the ceramic electronic component after firing may be prevented.

According to the embodiment of the present invention, the capacitance of the multi-layered ceramic capacitor may be secured.

While the present invention has been shown and described in connection with the embodiments, it will be apparent to those skilled in the art that modifications and variations can be made without departing from the spirit and scope of the invention as defined by the appended claims.

What is claimed is:

1. A multi-layered ceramic electronic component comprising:
   a ceramic body;
   internal electrodes formed within the ceramic body and including non-electrode regions formed therein; and
   external electrodes formed on ends of the ceramic body and electrically connected to the internal electrodes,
   in a cross section of the internal electrode, 70% or more of the non-electrode regions being distributed in a region formed between points inwardly spaced apart from each of upper and lower boundary surfaces of the internal electrodes by 5%.

2. The multi-layered ceramic electronic component of claim 1, wherein a thickness of the internal electrode is 0.5 μm or less.

3. The multi-layered ceramic electronic component of claim 1, wherein a thickness of the dielectric layer is 0.6 μm or less.

4. The multi-layered ceramic electronic component of claim 1, wherein the non-electrode regions include a ceramic powder.

5. The multi-layered ceramic electronic component of claim 1, wherein an average diameter of the non-electrode regions is 1 to 300 nm.

6. The multi-layered ceramic electronic component of claim 1, wherein the non-electrode regions includes voids.

7. The multi-layered ceramic electronic component of claim 6, wherein an average size of the voids is 30 nm or less.

8. The multi-layered ceramic electronic component of claim 6, wherein a ratio of the voids of which a central point is distributed in a region formed between points inwardly spaced apart from each of the upper and lower boundary surfaces of the internal electrode by 15 nm is 90% or more based on the entirety of the voids.

9. The multi-layered ceramic electronic component of claim 6, wherein in the case in which an average thickness of the internal electrode is 500 nm, a ratio of the voids distributed in a region formed between points inwardly spaced apart from each of the upper and lower boundary surfaces of the internal electrode by 3% is 90% or more based on the entirety of the voids.

10. The multi-layered ceramic electronic component of claim 6, wherein in the case in which the average thickness of the internal electrode is 400 nm, a ratio of the voids distributed in a region formed between points inwardly spaced apart from each of the upper and lower boundary surfaces of the internal electrode by 3.75% is 90% or more based on the entirety of the voids.

11. The multi-layered ceramic electronic component of claim 1, wherein connectivity of the internal electrode defined as a ratio of a length of a portion in which the internal electrode is actually formed to the overall length of the internal electrode is 90% or more.

12. A method of manufacturing a multi-layered ceramic electronic component comprising:
   preparing a ceramic green sheet;
   forming an internal electrode pattern using a conductive paste including a metal powder and a ceramic material powder;
   stacking the ceramic green sheet having the internal electrode pattern formed thereon to form a ceramic multilayer body; and
   firing the ceramic multi-layer body to form a ceramic body including dielectric layers and internal electrodes,
   in a cross section of the internal electrode, the internal electrode including 70% or more of non-electrode regions distributed in a region formed between points inwardly spaced apart from each of upper and lower boundary surfaces of the internal electrode by 5%.

13. The method of manufacturing a multi-layered ceramic electronic component of claim 12, wherein the firing of the ceramic multilayer body is performed at a heating rate of 30° C./60 s to 50° C./60 s and a temperature of 700° C. or less.

14. The method of manufacturing a multi-layered ceramic electronic component of claim 12, wherein connectivity of the internal electrode is 90% or more.

15. The method of manufacturing a multi-layered ceramic electronic component of claim 12, wherein a thickness of the internal electrode is 0.5 μm or less.

16. The method of manufacturing a multi-layered ceramic electronic component of claim 12, wherein a thickness of the dielectric layer is 0.6 μm or less.

17. The method of manufacturing a multi-layered ceramic electronic component of claim 12, wherein an average diameter of the non-electrode regions is 1 to 300 nm.

18. The method of manufacturing a multi-layered ceramic electronic component of claim 12, wherein the non-electrode regions include voids.

19. The method of manufacturing a multi-layered ceramic electronic component of claim 18, wherein an average size of the voids is 30 nm or less.

20. The method of manufacturing a multi-layered ceramic electronic component of claim 18, wherein a ratio of the voids of which a central point is distributed in a region formed between points inwardly spaced apart from each of the upper and lower boundary surfaces of the internal electrode by 15 nm is 90% or more based on the entirety of the voids.

21. The method of manufacturing a multi-layered ceramic electronic component of claim 18, wherein in the case in which an average thickness of the internal electrode is 500 nm, a ratio of the voids distributed in a region formed between points inwardly spaced apart from each of the upper and lower boundary surfaces of the internal electrode by 3% is 90% or more based on the entirety of the voids.

22. The method of manufacturing a multi-layered ceramic electronic component of claim 18, wherein in the case in which the average thickness of the internal electrode is 400 nm, a ratio of the voids distributed in a region formed between points inwardly spaced apart from each of the upper and lower boundary surfaces of the internal electrode by 3.75% is 90% or more based on the entirety of the voids.

* * * * *